July 28, 1925.
J. C. THAW
VALVE FOR GASES
Filed Nov. 24, 1923
1,547,974
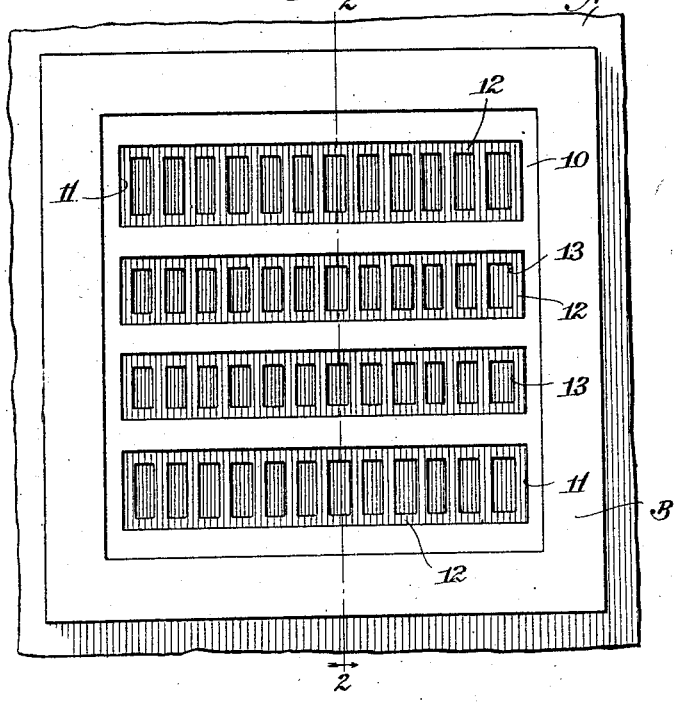
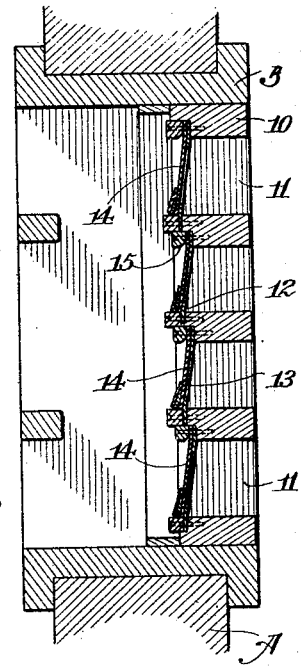
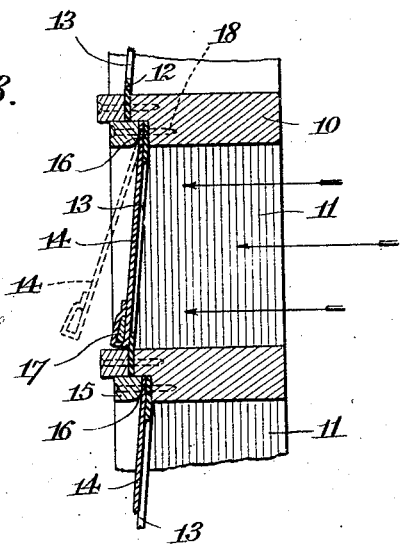
WITNESSES
INVENTOR,
J. C. Thaw.
BY
ATTORNEYS Patented July 28, 1925.

1,547,974

UNITED STATES PATENT OFFICE.

JOSIAH C. THAW, OF PITTSBURGH, PENNSYLVANIA.

VALVE FOR GASES.

Application filed November 24, 1923. Serial No. 676,803.

*To all whom it may concern:*

Be it known that I, JOSIAH C. THAW, a citizen of the United States, and a resident of Pittsburgh, in the county of Allegheny and State of Pennsylvania, have invented a new and Improved Valve for Gases, of which the following is a full, clear, and exact description.

This invention has relation to valves and contemplates a valve which is operable to permit of the passage of air, gas or other similar fluids therethrough in one direction only, the same being operable to close against its passage in the reverse direction.

Some of the outstanding objects of the present invention reside in the provision of a valve which is operable to its open position solely by the pressure of the air, gas or other fluid and to its closed position by said pressure, or the force of gravity in the absence of said pressure; which is extremely sensitive in its operation, but strong and durable in its construction; which is frictionless and hence reduces wear on the moving parts to an absolute minimum, thus increasing the length of life and usefulness of the device; which is practically noiseless; which requires no adjustment or regulation; which is extremely simple in its construction, and which is capable of many uses.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a face view of a valve constructed in accordance with the invention and in its applied position.

Fig. 2 is a vertical sectional view therethrough, taken approximately on the line indicated at 2—2 in Fig. 1.

Fig. 3 is a fragmentary enlarged vertical sectional view.

Referring to the drawings by characters of reference, A designates a panel, wall or other structure having a framed opening B extending therethrough. As shown in the illustrated embodiment of the invention, the valve consists of a frame 10 arranged within the frame opening B and the valve frame 10 is provided with a plurality of vertically spaced transverse slots 11 which are covered at one end by strips 12 each having a series of transversely spaced openings 13 producing in effect a grillwork at one end of the slots 11. The strips 12 are disposed at a slight inclination to the vertical and the openings 13 therein constitute a plurality of outlets for the passage of the air, gas or other similar fluid therethrough. In order to provide means for cooperation with the outlets to allow for the passage of the air, gas or other similar fluid therethrough in one direction and for closing the same against its passage in the reverse direction, a closure member 14 is provided for covering the openings of each strip 12 which constitutes the common closure for the series of outlets of said strip. The closure member preferably consists of a flexible strip of material such as paper, cloth, or the like which is secured at its upper end at a point above the openings or outlets 13 and arranged on that side of the strip 12 whereby it normally gravitationally covers the openings or outlets. Preferably the upper edge of each closure member is clamped between a portion of the strip 12 and a clamping strip 15, which clamping strip is rounded or curved at the lower corner of its confronting face as at 16 in order that the said strip will be flexed or curved when the same is lifted by the force or pressure of the air, gas or other fluid during its passage or escape through the openings or outlets 13. If desired, the lower free edge of the closure members 14 may be weighted by means of a transverse bar or strip 17 which also strengthens and reinforces the lower edge thereof to prevent distortion or lateral bending of the same whereby the closure is uniformly moved to open or closed position. Preferably a nail or other fastening element 18 is driven through the clamping strip 15, the closure member 14, the strips 12 and into the frame 10, while the lower end of the strips 12 are secured in a similar manner to the frame. In practice it is, of course, to be understood that the strips 12 and the attached ends of the closure members may be seated in rabbets in the frame as illustrated, or otherwise applied thereto. It is to be further noted that the outlets must be of a size relative to the flexibility of the material from which the closure members are made, to prevent the deflexion or forcing of the closure members too far into the outlets upon a reverse pressure exerted thereon, so as not to allow the escape or passage of the pressure in a reverse direction.

By way of illustration it may be pointed out that the device may be used in transoms, as for instance between a kitchen and other parts of the house so as to check the flow of air and odors from the kitchen through the house, while at the same time permitting the flow of air from other parts of the house to the kitchen. The device is also especially adaptable for use in ducts or outlets which are designed to exhaust the air from the inside of bathrooms but which ducts are often found to admit air by reason of some mal-adjustment of the system of ventilation. In use and operation of the device as illustrated when there is no pressure exerted in either direction the closure members will of their own weight, gravitationally lie in close contact with the face of the strips 12, while any pressure of air, gas or other similar fluid in a reverse direction will tend to more closely retain the same in said position; however, the slightest pressure exerted by the gas, air or fluid from the opposite direction in its passage through the openings in the frame 10 and openings in the strip 12 will effect the unseating or lifting of the closure members 14 away from the strips 12 to uncover the openings 13 therein by flexing the closure members 14. A counter current, however, no matter how rapidly effected will operate to reset the closure members against the strips 12 and effectually close the openings or outlets 13. From the construction it will be seen that the element of friction in the movement of the closure elements is entirely eliminated, while the opening of the closure members is accomplished solely by the pressure of the air, gas or other fluid thereagainst. It will be further noted that the device is extremely sensitive in its operation, yet strong and durable in its construction for the purpose for which it is intended, while the moving parts are subjected to practically no wear. Furthermore by cutting away the corner of the clamping strip 16 to present a rounded or curved surface against which the bending or flexing of the closure members operate eliminates any possibility of cutting or weakening the same at this point. From the foregoing it is therefore obvious that an extremely simple and inexpensive valve which is particularly adapted for the purposes specified, has been provided.

I claim:

1. A valve comprising an inclined seat member having an outlet opening extending therethrough and a flexible closure element secured to the seat member above the outlet opening and normally resting against said seat member gravitationally to close the outlet opening, said closure element being capable of flexing away from said seat at its point of securement thereto upon the exertion of pressure thereagainst in one direction, and means adjacent said point of securement presenting a curved surface against which said closure element flexes, whereby to prevent cracking or deterioration by bending of said element at a sharp angle.

2. A valve for gases comprising a plurality of superposed seat members each having a plurality of transversely spaced outlet openings extending therethrough, a common flexible closure element for each seat member secured thereto above the outlet openings thereof and normally resting against said seat members gravitationally to close all of the outlet openings and capable of flexing away from said seat members at their points of securement thereto upon the exertion of pressure thereagainst in one direction, and means adjacent the point of securement of each closure member presenting a curved surface against which the said closure elements flex, whereby to prevent sharp angular bending of said closure elements when the same are flexed.

3. A valve for permitting the passage of air or other gases in one direction therethrough and operable to check its passage in the opposite direction therethrough, comprising a member having an outlet opening therein, said member being disposed at an inclination to the vertical, a flexible closure element for said outlet opening secured at its upper end to said member above the outlet opening and to that side of the same whereby it normally gravitates in the absence of pressure in either direction, to a position against the member to close the outlet opening, and means at the secured end of the closure element presenting a curved surface against which said closure element flexes when moved to open position by the pressure, whereby to preclude a sharp angular bending of the closure element when flexed and the resultant cracking or deterioration of the same.

JOSIAH C. THAW.